Figure 1:
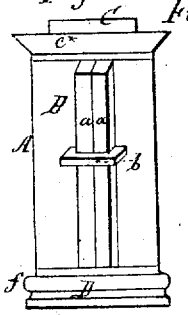

B. S. & M. R. Pierce. Sheet 1

2 Sheets.

Tile Mach.

No. 3,413. Reissued Apr. 27, 1869.

Witnesses.

John A. Wunderlich

Chas. L. Coombs.

Inventor.

Bradford S. Pierce and Mason R. Pierce,

By S. D. Cozzens, Atty.

B. S & M. R. Pierce. Sheet 2.

2 Sheets.

Tile Mach.

No. 3,413. Reissued Apr. 27, 1869.

Witnesses.

John A. Wiederhorn

Chas. S. Coombs.

Inventor.

Bradford S. Pierce and Mason R. Pierce,

By S. D. Cozzens Atty.

UNITED STATES PATENT OFFICE.

BRADFORD S. PIERCE, OF NEW BEDFORD, MASSACHUSETTS, AND MASON R. PIERCE, OF WOODSTOCK, NEW YORK.

IMPROVED MACHINE FOR MAKING DRAIN-PIPES.

Specification forming part of Letters Patent No. 23,703, dated April 19, 1859; Reissue No. 1,897, dated February 28, 1865; Reissue No. 2,841, dated January 14, 1868; Reissue No. 3,413, dated April 27, 1869.

*To all whom it may concern:*

Be it known that we, BRADFORD S. PIERCE, of New Bedford, in the State of Massachusetts, and MASON R. PIERCE, of Woodstock, in the State of New York, have invented certain new and useful Improvements in Molds for the Manufacture of Pipes or Tubes for Drains, Flues, or other similar purposes, and also in machinery to be used in connection therewith; and we hereby declare that the following is a full, clear, and exact description of the same, reference being had to the drawings which accompany and form part of this specification.

Letters Patent of the United States were, on the 1st of August, 1854, obtained by the said Bradford S. Pierce, in conjunction with one Charles M. Pierce, for an improvement in molds for cement or earthen tubes, consisting principally of what is termed in said patent a "spring-case," to be used, in combination with a core therein described, for the purpose of molding pipes or tubes of the description above mentioned.

In making use of said improvement it has been necessary, after the pipe or tube was molded, to lay the case, with the pipe and core in it, down in a horizontal position, so that the core might be removed by means of blows from a sledge or maul; but as at this stage of the manipulation the material of the pipe would be in a soft and plastic state, the core could not be removed immediately, lest the pipe should sink or collapse and become unserviceable. Therefore it has been customary to wait a short time to permit the material to "set" somewhat before the core was taken out. When, however, the set had taken place to much extent the jar of the blows employed to remove the core would frequently crack the pipe and spoil it. In addition to this, if the pipe was large in diameter—say eight inches or upward—its own weight would, after the core was extracted, generally cause it to sag and become more or less oval in shape, and would also frequently crack it, thereby rendering it unmarketable, and often wholly unfit for use. These evils were of importance, yet, notwithstanding them, this apparatus was greatly superior to any mold for the purpose which had preceded it. Our present improvements, however, were devised mainly to remedy the injurious consequences mentioned; and to this end they consist, first, of a new and improved mold composed of a suitable case, a suitable core, and what we term a "core-socket," this core-socket being so constructed and so arranged relatively to the case and core, and so combined with them, that it holds one end of the case and core in proper position when the mold is put together for use, and forms or shapes one end of the pipe, thus constituting a working portion of the mold during the whole of the molding process, and is also adapted to permit the core to be forced or moved through it, so that the case and core may stand in a vertical position while the core is being extracted, and likewise supports the case and pipe, so that the latter cannot be cracked or injured by the operation of removing the core, or by the transferring of the case and pipe—usually while the latter is in a more or less plastic state—from the place where the molding is done to a convenient situation for taking off the case and storing the pipe to mature for use; second, of the combination, with the case and core-socket, of suitable means of applying, when required, a sufficient pressure or force to remove the core through the core-socket from the finished pipe without causing the injury to the latter which the jar of blows upon the core would generally produce; and, third, of certain improved machinery which may be advantageously used in connection with one mold, and which is hereinafter fully described.

Figure 3:
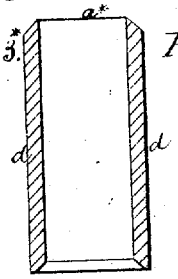
Figure 6:
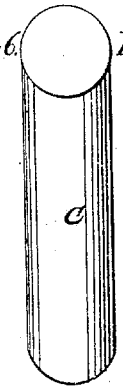
Figure 2:
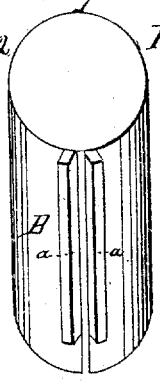
Figure 15:
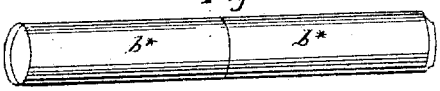
Figure 14:
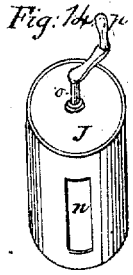
Figure 9:
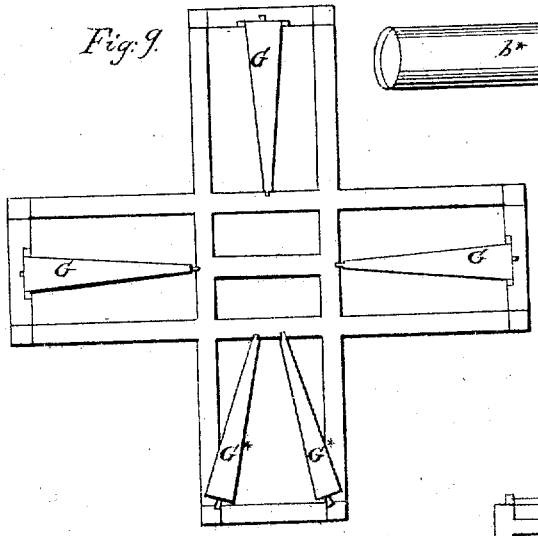
Figure 13:
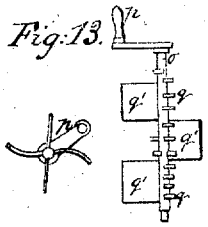
Figure 8:
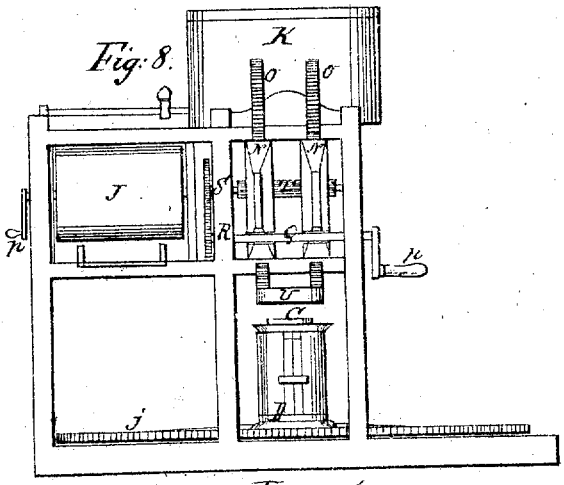
Figure 5:
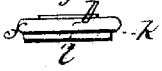
Figure 4:
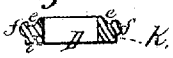
Figure 10:
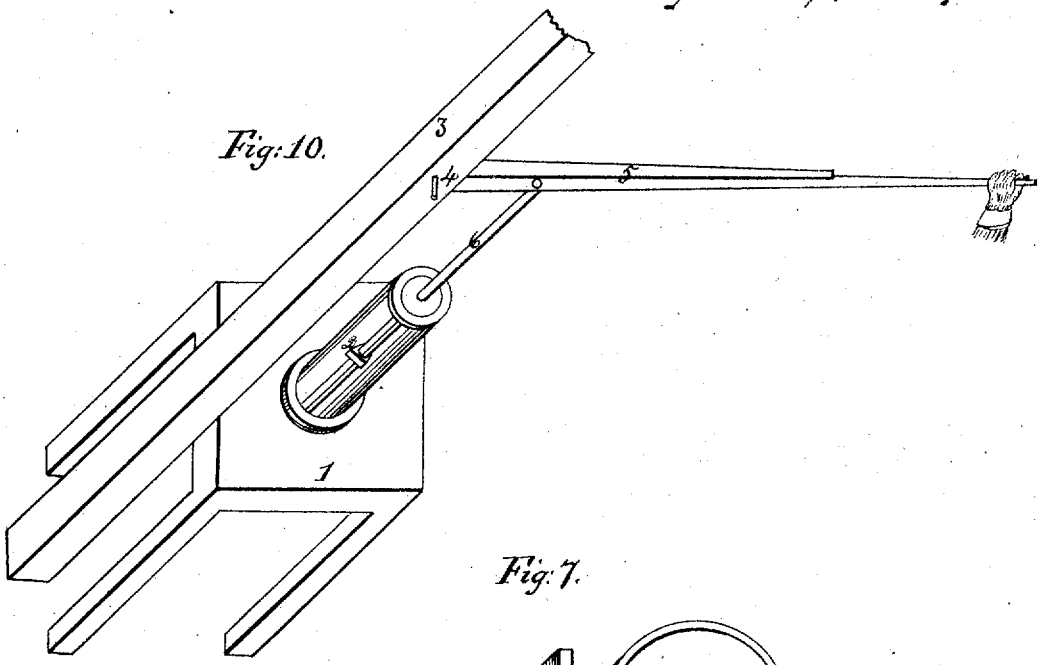
Figure 7:
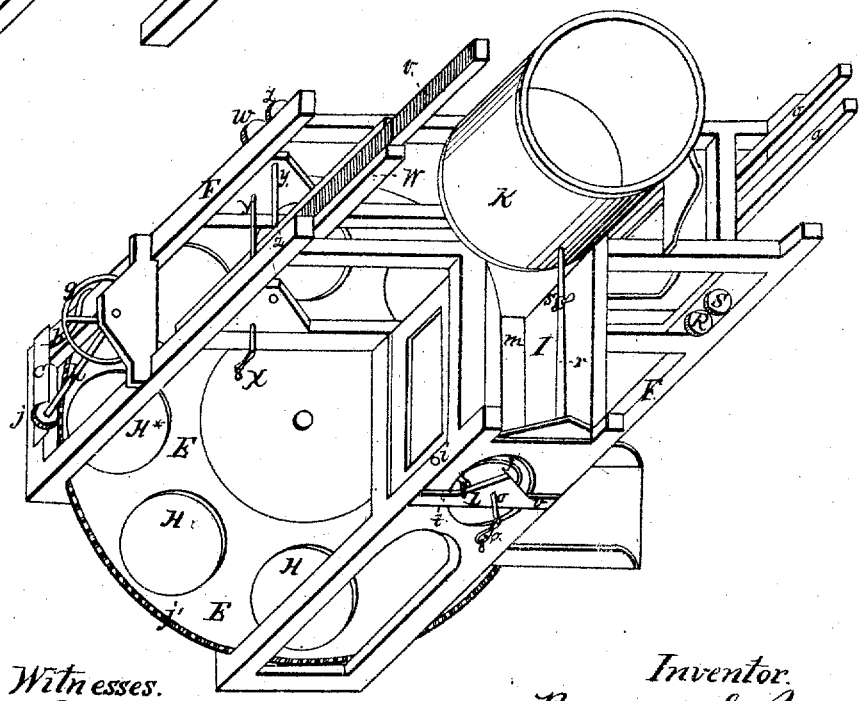

In the accompanying drawings, Figure 1 represents a front elevation of a mold which embodies the first part of our invention. Fig. 2 represents one form in which the case portion of the mold may be constructed. Fig. 3 is a vertical cross-section of the core-socket portion of the mold, and Fig. 3* is a vertical section of a finished pipe as made in our improved apparatus. Fig. 4 is another vertical section of the core-socket, and Fig. 5 is a side elevation thereof, showing one form of the part of the socket which shapes or molds one end of the pipe during the molding process. Fig. 6 is a perspective view of a form of core which we have used with our mold. Fig. 7 is a perspective view of our improved machinery to be employed, when preferred, in connection with our mold, and showing also one form in which we have constructed and applied our means of producing, when desired, the requisite pressure or force to remove the core from the finished pipe. Fig. 8 is a front elevation of said machinery, showing a mold in proper position for forming a pipe. Fig. 9 is a plan of a portion of the said machinery. Fig. 10 is a perspective view of a modification of our said machinery and means of applying pressure or force to the core, illustrating a very simple form thereof. Figs. 11, 12, 13, and 14 are details of some of the same parts represented in the other figures, Fig. 11, *c**, showing a top view of a small hopper; and Fig. 15 is a perspective view of two lengths of finished pipe put together for use.

In all the figures similar letters denote similar parts.

To enable those skilled in the art to construct and employ our inventions, we will proceed to describe one mode in which we have successfully put them in operation.

In Fig. 1 the form of our mold there represented is shown with its different parts arranged and combined as they are when in operation. The case B of this mold may be made of thin metal or of any other proper material, and when the mold is in use is capable of being efficiently closed around the material and of being opened, and is provided with means of fastening its sides together, which in the form shown in the drawings consist of strips of wood or other material, *a a*, secured to the sides of the case, and adapted to hold them closely together by the application of the clamp *b*. Any other construction of case, however, having the same capacities, and any other efficient means of fastening the sides of the case together, will answer the purpose.

Figure 11:
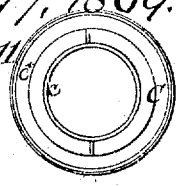
Figure 12:
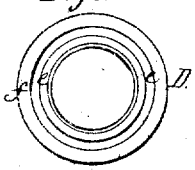
Figure 3:
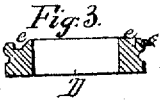

The core C may be of wood, metal, or other proper material, and of any suitable construction, and when the mold is ready for use the case is made to stand over it, as seen at Fig. 1, and at its upper end is, by the stay *c*, Fig. 11, or other convenient means, retained at any desired distance from it, the space left between the core and the case being the same in width as the intended thickness of the walls *d d* of the pipe to be molded.

The core-socket D is a very important part of our invention, as by its means we are enabled to remedy the defects of previously-existing molds of this character. As shown in the drawings, it is in shape somewhat like a short cylinder, and is hollow, having an internal diameter sufficient to admit within it the lower end of the core, and thereby hold it at any desired distance from the case, and also to permit the core to be made to pass through it while being extracted from the finished pipe, and in the construction shown in the drawings is at its upper edge provided with a part, *e e*, which we term a "beveled ring," and which, in the molding, serves to form or shape the lower end of such a pipe as represented, and also, preferably, with a flange or lip, *f*, which, when the case is in place holds it in proper position in the mold. Any other desired contour or section may, however, be given to the portion of the core-socket which forms the end of the pipe, according to the shape which such end is designed to have. If the end of the pipe is to be square, the forming portion of the core-socket should be flat.

The machinery which we have devised to be employed, when preferred, in connection with our mold, consists of a platform, E, Fig. 7, which is capable of being revolved within the frame-work F upon the conical rollers G and G* (seen at Fig. 9) by means of the hand-wheel *g*. This hand-wheel is fixed upon the upper end of a vertical spindle, *h*, working in suitable bearings in the frame-work, and having at its other end a pinion, *j*, which gears with teeth *j'* on the perimeter of the platform E.

H H* are apertures in the platform, in which molds constructed in the manner above described, or in any other manner, may be set to be carried around on the platform, to be filled and then emptied for use again. In order to properly secure the molds in the apertures while these operations are being performed, we have preferred to make our core-sockets with a shoulder, *k*, formed by the under side of the projecting lip *f*, and to give to the apertures a diameter just great enough to receive the lower part, *l*, of the core-sockets with a snug fit, letting the shoulder rest on the top of the platform, so that the entire mold may be readily and securely retained in an upright position while on the platform, and may also be easily removed when it is desired to discharge from it the finished pipe.

In order to sustain the core, when desired, during the molding process, its lower end may be allowed to rest upon one of the rollers, G, Fig. 9.

I is a hopper with an open bottom, *m*, secured at one side of the frame-work F, and in it may be placed the ingredients of which the pipe is to be composed, preparatory to their being mixed. Beneath the hopper is a hollow cylinder, J, in which this mixing may be effected. This cylinder rests on suitable journals working in bearings in the frame-work, and is capable of being turned round by hand, one object of which is to bring the opening *n* in it (shown in Fig. 14) in line with the open bottom of the hopper I, in order to admit of the introduction into the cylinder of the ingredients to be mixed. Through the cylinder runs a shaft, *o*, resting in proper bearings in the frame-work and turned by the crank *p*. To this shaft are attached what we call "mixing-pins" and "floats," or, in other words, stirrers, *q* and *q'*, which, when the shaft is rotated, greatly facilitate the mixing, the cylinder during the operation being kept stationary.

K is a cistern, placed over one end of the hopper I, and containing water to be used in mixing the ingredients; and *r* is a pipe running from the cistern and extending over the hopper, into which, as well as into the cylinder J, through the opening *m*, water may be admitted by the faucet *s* while the mixing is going on.

L is a stop or projection on the exterior of the cylinder, so arranged that when the cylinder is revolved sufficiently far to bring the stop against the frame-work at *t* the opening *n* in it will be in line with the open bottom of the hopper I, so that the ingredients may be put in, and when in this position the removable pin *i* is inserted through the frame-work, as seen in Fig. 7, so as to hold the cylinder stationary while the mixing is being performed. After the mixing is completed the cylinder is revolved by hand partly around in the reverse direction, until the stop strikes the frame-work at *v*, when the opening *n* will be just over the spout M, so that its contents will be upset or dumped into the latter to be removed to the molds to form the pipe. When the stop is at *v* another pin (not seen in the drawings, but operating like the pin *i*) may be inserted through the frame-work to hold the cylinder stationary while its contents are being dumped.

N N are guides, in which travels a double rack, O O, which is operated by the crank P, which turns the shaft Q, on which is keyed a pinion, R, which meshes into a spur-gear, S, on the pinion-shaft T, the leaves of which latter take into the teeth of the racks, and thereby carry them up or down, according as the crank P is turned.

To the lower ends of the racks O O is secured a concave-headed piston, U, which moves up and down with the racks. This piston constitutes a tamper, for when the pipe is to be molded the mold is brought round on the platform underneath it, and the piston is by the crank P driven down at intervals several times during the molding operation upon the ingredients in the molds, so as to force them into all parts of the space between the core and the case and to consolidate them properly together; and when pipe of the form shown in the drawings is to be made it also by means of its concave head gives at its last strokes, after the mold is filled, the proper convex form to the upper end of the finished pipe.

At Fig. 7 is shown one mode in which we have successfully put in operation our invention of combining with the core and core-socket means of applying pressure or force to remove the core from the finished pipe without jar from blows. In this figure V is a single rack moving in a guide, W, and operated by the crank X, which turns the shaft Y, on which is keyed the pinion *w*, which meshes into a spur-gear, *x*, on another shaft, *y*, which latter carries a second pinion, Z, which takes into the teeth of the rack V, and thereby raises or lowers it. Each mold, after it has been filled, is by the motion of the platform carried beneath the rack, and the latter is then by the crank X forced down upon the core C, which is thus driven through the pipe and core-socket, and through the aperture H* in the platform between the rollers G* G*, which are arranged with sufficient space between them for the core to pass, and out into a suitable pit below.

Any convenient device may be employed to arrest the movement of the platform at the proper points respectively to stop the mold under the tamper U and the rack or core-reliever V.

*a**, Fig. 3*, is a semi-section of a finished pipe as it stands in the mold, and *b* b** are two lengths of finished pipe connected together as they are when in use.

The operation of the machinery shown in the drawings is very simple. The platform having been revolved and stopped so as to bring one of the molds under the tamper U, the ingredients of which the pipes are to be composed are placed in the hopper I in such proportions relatively to each other as are suitable, and the cylinder J is rotated until the opening *n* comes beneath the hopper. The cylinder is then stopped and secured in this position by the pin *i*, the ingredients are introduced into it, and sufficient water from the cistern K is from time to time let in among them through the hopper and the opening *m* to effect the mixing. The shaft *o*, with its stirrers, is then turned until the contents of the cylinder are thoroughly mixed, when the cylinder is again rotated partly round, so as to "upset" it, or, in other words, bring the opening *n* over the spout M. The mixture is then dumped into this spout and carried away with shovels to that one of the molds which is under the tamper and thrown into it, and to facilitate this filling of the molds we have sometimes used a small hopper or funnel on the tops of them, as seen at *c** in Fig. 1. The tamper is then operated at intervals to consolidate the materials while the mold is being filled, and to give the convex or other desired form to the upper end of the pipe, and as soon as the filling is completed the platform is again revolved and stopped so as to bring the filled mold under the rack or core-reliever V, while the latter is by the crank X forced down upon the core to drive it through the pipe, core-socket, and aperture H* in the platform out into the core-pit. After the core is discharged the platform is once more revolved so as to bring the filled mold between the core-reliever and the hopper I, and the mold is then removed and the pipe, as soon as it is sufficiently set, is taken out and the mold is returned to the platform for further use. The same operation is repeated with all the molds in succession.

Our mold may be used without the aid of the machine above described, and in Fig. 10 will be seen one mode of so employing it, and also of applying our improved means of removing the core from the finished pipe. The mold, with its core-socket, is placed upon a suitable base—such as in this figure, which represents a platform or table, 1, having in its top an aperture large enough to receive and hold the core-socket which, with the rest of the mold, may be held in place in it in the manner already described. The ingredients, after being properly mixed, may be filled into the mold and rammed or tamped by hand. 2 is the mold, setting in the aperture in the table. 3 is a post at one side of the table, and 4 is a pin in this post, upon which works a hand-lever, 5. To this lever is attached a vertical rod, 6, which, when the lever is brought down, is forced against the top of the core 7 and drives it through the pipe, core-socket 8, and table into a space or pit below the latter. In order to keep the top of the core in position during the filling process, the stay *c*, Fig. 11, may, if desired, be employed, as previously described, to sustain the core properly in the case, and, when preferred, the hopper *c**, Figs. 1 and 11, may be placed on the top of the mold. These modifications of our improvements (illustrated in Fig. 10) will be found to be very simple, cheap, and convenient.

From the foregoing descriptions the nature and operation of our core-socket will be clearly understood, and we now proceed to state what we consider its essential features. These are that it shall be so constructed and arranged in such a relation to the other parts of the mold and be so combined with these other parts that it shall hold the lower end of the core at the desired distance from the case, and shall be enabled to form or shape one end of the pipe, and thus constitute an active or working portion of the mold during the whole of the molding process; that it shall support the case and pipe, so that when the core is removed through the aperture provided in the socket for that purpose no cracking of the pipe or injury to it can ensue, and so that the pipe, after it is finished, can by the aid of the socket be carried in the case in a vertical position without injury from the place of molding to any convenient situation to be discharged from the socket and case to mature for use by the natural setting and hardening of the material; and, finally, that it shall be made as a part of the mold, separate and distinct from the other parts thereof, and be so arranged and so combined with these other parts that it is capable of being kept continuously connected with them during the entire operation of molding and finishing the pipe, by which means the core can be discharged from the mold through the pipe and core-socket at the same place in the apparatus where the molding and finishing is performed, and whereby, also, the pipe can be freed from the mold after the molding is finished without the pipe and mold-case being required to be turned end for end, which is a very inconvenient operation in practice, and which, on account of the greenness of the material at this stage of the manipulation, is extremely liable to cause the pipe to crack or get out of shape.

We do not confine ourselves to the precise construction of parts shown in the drawings; nor do we limit ourselves to removing the core by forcing it through the mold-case and core-socket while the latter-named two parts remain stationary, as it is evident the core itself may be stationary, and that the rest of the mold may be discharged from it by drawing or otherwise removing the core-socket and mold-case from around it, either with or without the application to the socket and case of the means which we have represented, or their equivalent, for removing the core without injury to the finished pipe.

We are aware that before our invention drain-pipes have been made or finished in molds containing a case and a core, and also a means or provision for forming a shoulder on one end of the pipe. We therefore make no claim to merely this; but,

Having thus described our improvements, what we claim as new, and desire to secure by Letters Patent, is—

1. The case, in combination with the core and with the core-socket, when the latter is constructed and operates in the manner herein described.

2. In a mold for molding drain-pipe, a core-socket and a case, constructed, arranged, and combined in the manner described, so that the core-socket shall constitute a working portion of the mold during the whole of the molding process, substantially as and for the purposes set forth.

3. The combination, with the core and core-socket, of suitable mechanism for removing the core through the core-socket from the finished pipe without injury to the latter, substantially in the manner and for the purposes described.

4. The arrangement of the mold-case and core upon a suitable platform or base in the manner described, so that the pipe can be molded and the core discharged therefrom without changing the position of the pipe and mold-case, substantially as set forth.

5. The arrangement of the mixing apparatus and of the core-relieving devices above the platform which conveys the molds, in the manner and for the purpose substantially as specified.

6. The combination of the case, core, and core-socket with the perforated revolving disk, substantially as and for the purposes described.

BRADFORD S. PIERCE.
MASON R. PIERCE.

Witnesses:
SAM. P. BURT,
ELIJAH SMITH.